Feb. 12, 1935.  C. J. WERNER  1,991,039
SYSTEM OF MOTOR CONTROL
Filed March 22, 1933  2 Sheets-Sheet 1

INVENTOR
Calvin J. Werner
BY
his ATTORNEYS

Feb. 12, 1935.                     C. J. WERNER                     1,991,039
SYSTEM OF MOTOR CONTROL
Filed March 22, 1933                2 Sheets-Sheet 2
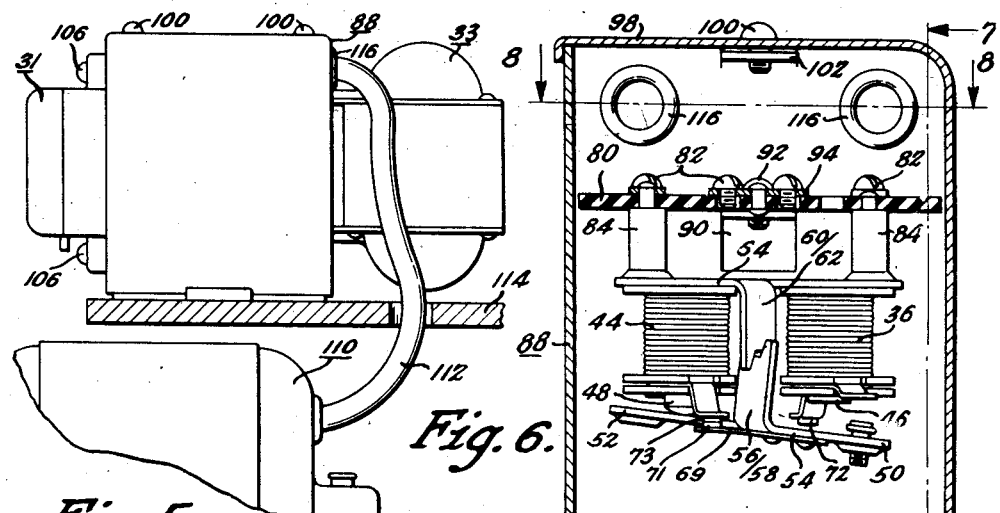
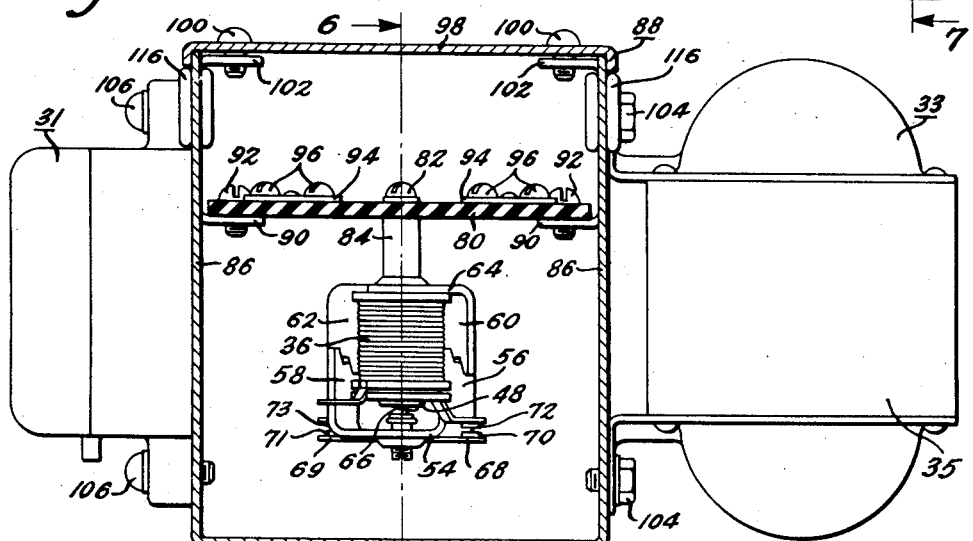
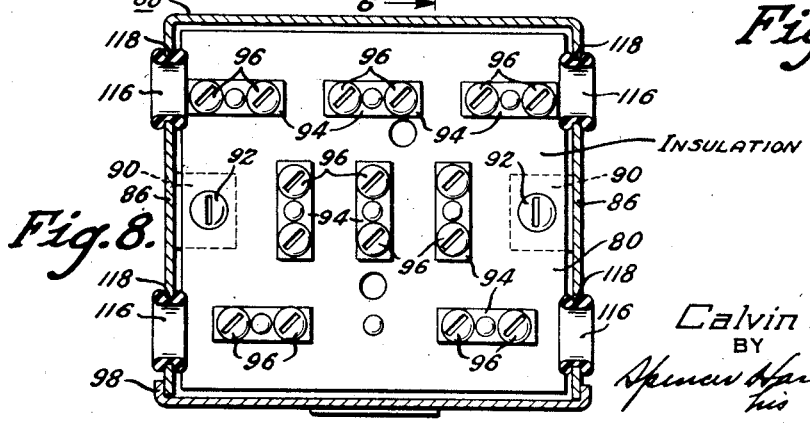
INVENTOR
Calvin J. Werner
BY
his ATTORNEYS Patented Feb. 12, 1935

1,991,039

UNITED STATES PATENT OFFICE 1,991,039

SYSTEM OF MOTOR CONTROL

Calvin J. Werner, Dayton, Ohio, assignor, by mesne assignments, to General Motors Corporation, Detroit, Mich., a corporation of Delaware Application March 22, 1933, Serial No. 662,028

16 Claims. (Cl. 172—279)

This invention relates to alternating current motors and more particularly to a system of starting and controlling single phase alternating current motors.

An object of this invention is to provide a reliable and durable control system for single phase alternating current motors.

Another object of this invention is to provide an electrically operated control system for controlling the starting and running circuits of single phase alternating current motors.

Another object of this invention is to provide a control system for single phase alternating current motors that will compensate, within a reasonable range, for variations in line voltage.

Another object of this invention is to provide an electrically controlled system for controlling the reactor circuit of a reactor start type of single phase motor.

Further objects and advantages of the present invention will be apparent from the following description, reference being had to the accompanying drawings wherein a preferred embodiment of one form of the present invention is clearly shown.

In the drawings:

Fig. 5 is an elevation of an assembly embodying the present invention.

Fig. 6 is a sectional view of the switch housing taken substantially on the line 6—6 of Fig. 7, and showing the side view of the electromagnetic switch.

Fig. 7 is a sectional view of the switch housing taken substantially on the line 7—7 of Fig. 6, and showing an end view of the electromagnetic switch as well as plan views of the parts associated with the control assembly.

Fig. 8 is a sectional view taken substantially on the line 8—8 of Fig. 6.

Figure 1:
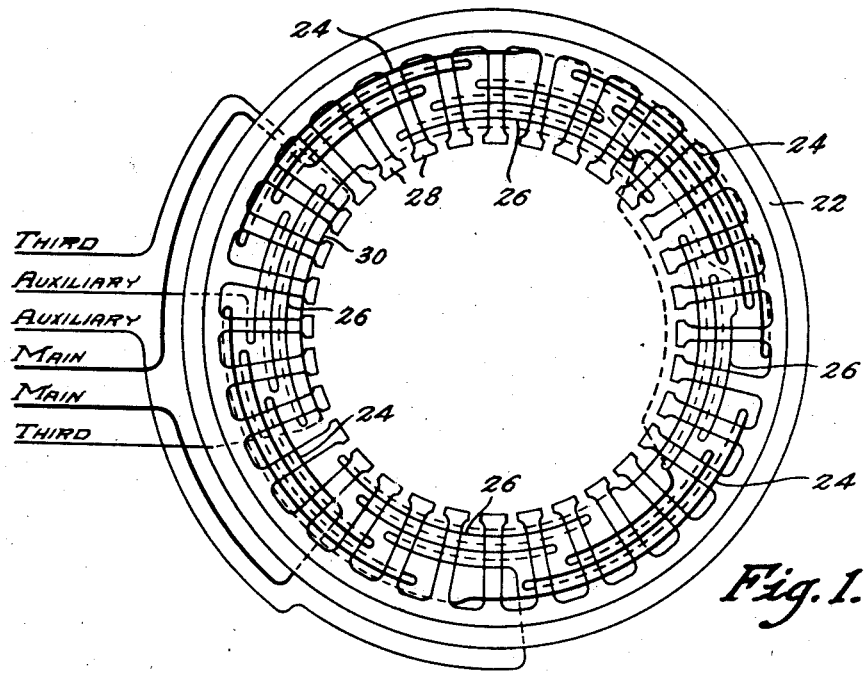
Fig. 1 is a wiring diagram of the stator of a motor adapted to be used in the present invention.
Figure 2:
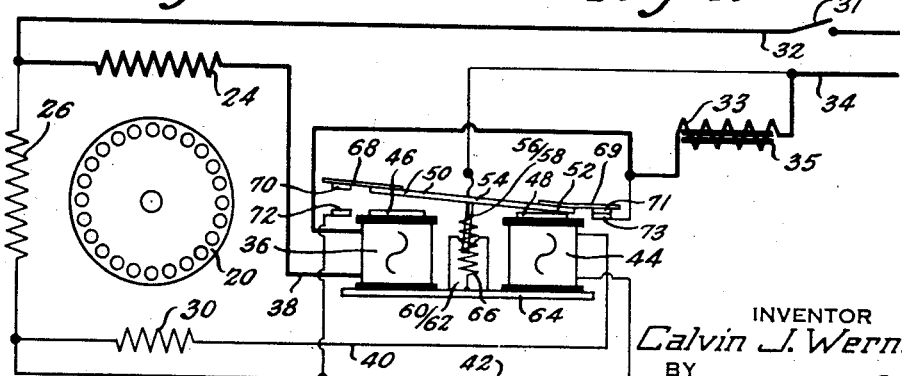
Fig. 2 is a wiring diagram illustrating the circuit connections of a system embodying the present invention.

With particular reference to Figs. 1 and 2, the electric motor comprises a squirrel cage rotor 20 in cooperative relation with a stator 22 having teeth such as 28 upon which a main field winding 24 and an auxiliary field winding 26 are arranged as shown in Fig. 1. The stator teeth surrounded by a section or part of the auxiliary field winding 26 are also surrounded by a third winding 30 which is effectively magnetically coupled with the rotor and only the auxiliary field winding 26, since the coupling between the winding 30 and the ends of the main field winding 24 is substantially neutralized by virtue of the substantially equal coupling with both ends of the winding.

A power supply line wire 32 is connected to the main field winding 24 and to the auxiliary field winding 26. Another power supply line wire 34 is connected to an electromagnet 36 through a reactance or inductance 33 having a magnetic core 35, and the electromagnet 36 is, in turn, connected by a wire 38 to the main field winding 24. The third winding 30 is connected by wires 40 and 42 to an electromagnet coil 44, and also has one end connected to an end of the auxiliary field winding 26. Electromagnets 36 and 44 are provided with cores 46 and 48 respectively, which cooperate with lever arms 50 and 52 of a common armature 54, which armature is provided with two bifurcated arms 56 and 58 which straddle respectively bifurcated arms 60 and 62 of the base 64, as shown in the diagram. The armature 54 is maintained yieldingly either in the position inclined toward the core 48, or inclined toward the core 46, by a spring 66 connecting the armature 54 with the base 64, and so arranged that its center line of action moves to either side of a plane through the vertical center lines of the arms 56, 58, 60 and 62. The armature 54 has contact carrying members 68 and 69 mounted thereon and carrying contacts 70 and 71 respectively, which contacts are alternately engageable with cooperating contacts 72 and 73 respectively. The contact 72 is connected to the wire 42, and thus to the common ends of the auxiliary field winding and third winding. The contacts 70 and 71 are connected through the armature 54 to the power supply line wire 34, and the contact 73 is connected to the reactance or inductance 33 intermediate that reactance and the electromagnet 36.

When the power supply line circuit is closed through a switch 31, the electromagnet 36 is energized by virtue of its connection to the main field winding 24, and thus to both sides of the power supply line. At the instant prior to starting, only a small current is induced in the electromagnet 44, since at that instant prior to starting the rotor is stationary, and since without rotation of the rotor there will be no rotational voltage induced in the third winding 30, although there is a small transformer voltage induced therein after the circuit to the auxiliary field winding 26 is closed. Therefore, regardless of the voltage impressed upon the main field winding 24, within reasonable limits, the electromagnet 36 will attract the armature 54 and thereby bring about engagement of the cooperating contacts 70 and 72. The engagement of these contacts is facilitated and aided by the spring 66 when it crosses the center line of the bifurcated arms to the side toward which the armature is moved. The engagement of the contacts 70 and 72 close the circuit between the power supply line wire 34 and the auxiliary field winding 26. At the same time, the movement of the armature that brings about engagement of the contacts 70 and 72 disengages the contacts 71 and 73, and thereby provides a circuit between the power supply line wire 34 and the main field winding 24 through the reactance 33 and the electromagnet 36. Since the circuit between the power supply line wire 34 and the main field winding 24 is through the reactance 33, and the circuit to the auxiliary field winding 26 from the power supply line wire 34 is substantially direct, a phase difference is produced between the currents in the main and auxiliary field windings; that is, the current in the main field winding 34 will lag that in the auxiliary field winding 26 because of the inductive reactance of the reactance 33. After engagement of the contacts 70 and 72, the pull of the electromagnet 36 upon the arm 50 of the armature 54, together with the urging force of the spring 66 tend to maintain engagement of the contacts. The circuit thus formed to the main and auxiliary field windings 24 and 26 respectively, together with the positions of those windings, causes a rotating field to be produced that starts the rotation of the rotor 20.

Figures 3, 4:
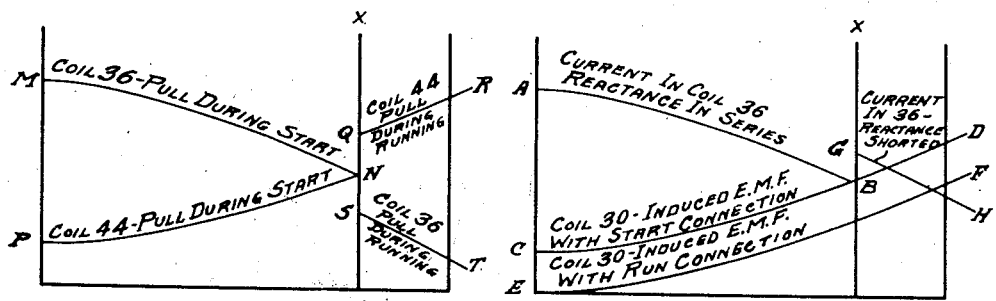
Fig. 3 illustrates by curves the variations in pull of the electromagnetic switch corresponding to variations in speed of the rotor.
Fig. 4 illustrates by curves the variations in the induced electromotive forces and current in the electromagnets of the electromagnetic switch corresponding to variations in the speed of the rotor.

A rotational voltage is induced in the third winding 30 by virtue of its magnetic relation with the rotor field, and the rotation of the rotor. Referring to Fig. 4, it will be noted that as the rotor speed increases, the current in the electromagnet 36 decreases, while the induced electromotive force in the winding 30 increases, as represented by the curves A—B and C—D respectively. Consequently, the pull effected by the electromagnet 36 upon the armature 54 decreases, as represented by curve M—N in Fig. 3; while the pull effected by the electromagnet 44 increases due to the increased voltage induced in the winding 30 due to the increase of rotor speed, and as represented by the curve P—N. At a certain critical speed, such as that represented by lines x—y in Figs. 3 and 4, the force exerted upon the arms 50 and 52 of the armature 54 are substantially equal, and an increase in speed above that value will result in the armature 54 being moved into a position such as that indicated in Fig. 2 with the armature 54 attracted by the electromagnet 44. Thus, the contacts 70 and 72 will be thereby disengaged, and the circuit from the line wire 34 to the auxiliary field winding 26 opened. By this same armature movement, the contacts 71 and 73 will be engaged to short circuit the reactance 33 and effect a substantially direct circuit to the main field winding 24 from the power supply line wire 34 through the electromagnet 36. The rotor, at this point, shall have reached a sufficient speed to produce its own rotating field by virtue of the transformer and rotational voltages induced therein, and the running circuit thereby established.

Referring again to Figs. 3 and 4, it will be noted that when the switch is thus in the run position, and the rotor is rotating at a speed above that indicated by the line x—y, the voltage induced in the third winding 30 which effects the energization of the electromagnet 44 is less than when the switch is in the start position and the rotor speed is below that indicated by the lines x—y, as represented by the curve E—F. This is due to the opening of the circuit to the auxiliary field winding 26, with which the third winding 30 is magnetically coupled. However, the electromagnet 44 exerts a greater force upon the arm 52 of the armature 54 than the electromagnet 36 does upon the arm 50, as represented by the curves Q—R and S—T. This is due to the characteristic variation in the force of the magnet with the distance from the magnet. The current through the electromagnet 36 and the main field winding 24 increases suddenly when the reactance 33 is short circuited, as indicated by the curve G—H in Fig. 4, since the short circuiting of the reactance 33 suddenly reduces the impedance in the circuit of the main field winding 24.

With reference to Figs. 5, 6, 7 and 8, the electromagnetic switch shown, and illustrated diagrammatically in Fig. 2, is the subject matter of a copending application, Serial No. 642,158, and is explained there in detail. Since the principal elements of the structure and the operation of this switch have previously been described herein, and similar reference numerals apply to similar parts in Figs. 5, 6, 7 and 8, no further explanation of the details of this switch will be given with reference to the latter figures. The base 64 of the switch is attached to an insulating mounting piece 80 by screws such as 82 or other suitable fastening means, and is preferably spaced therefrom by spacer 84. The insulating mounting piece 80 is secured to walls 86 of the housing 88 preferably by brackets 90 and screws 92 threaded into the brackets 90. The insulating mounting piece 80 also serves as a suitable mounting for terminals 94 secured thereto and having screws such as 96 threaded therein to provide suitable connections for the necessary connecting wires and leads. The housing 88 has a removable cover 98 preferably held in place by screws such as 100 that are threaded into brackets such as 102 formed on the walls 86. The reactance 33 is secured to one of the housing walls 86 preferably by bolts such as 104, and a switch 31 is secured to another of the walls 86 preferably by screws such as 106. The electromagnetic switch and its housing, the line switch 31 and the reactance 33 thus form a unit or assembly that may be attached to a motor, or mounted near a motor as indicated in Fig. 5, in which figure the motor 110 is connected to the control assembly by the cable 112 containing the connecting leads, and the control assembly is mounted upon a support 114. Insulating grommets 116 are provided in suitable openings 118 for the passage of suitable connecting leads to the terminals 94 of the control assembly.

As disclosed in the embodiment of the present invention, the windings, including the main and auxiliary field windings 24 and 26 and the third winding 30 are considered stator windings because wound thereon. By virtue of the placing or position of the third winding, that winding has greater magnetic coupling with the auxiliary field winding than with the main field winding. In fact, it is effectively magnetically coupled with only the auxiliary field winding. Hence, there is some voltage induced in the third winding when the circuit to the auxiliary field winding is closed, and at the instant prior to the starting of the rotor. However, due to the magnetic relation of the rotor and the third winding, the voltage induced in the third winding increases as the rotor speed increases, since the rate at which the third winding cuts the rotor flux increases with the rotor speed. Having the inductive reactance 33 in series with the main field winding 24 during starting causes the current through the main field winding to lag that in the auxiliary field winding. Then, since the rotation of the rotor produces a counter electromotive force in the main field winding, which counter electromotive force increases with the speed of the rotor, the current through the main field winding decreases as the rotor speed increases.

Since the electromagnets 36 and 44 are connected to the main and third windings respectively, and in fact, electromagnet 36 is connected in series with the main field winding 24 while the electromagnet 44 is connected across the third winding 30, and, since the pull of the electromagnets is dependent upon the current therethrough, the pull of the electromagnet 36 decreases as the pull of the electromagnet 44 increases. The electromagnets opposingly coact upon a common armature and the position of that armature is consequently controlled by the current through the main field winding and the potential across the third winding, and thus serves as a means for controlling the starting and running circuits of the motor, in starting the motor, or in the operation of the motor when an overload or some such condition occurs to appreciably change the speed of the motor.

Since the main field winding and the electromagnet 36 are connected in series, and to the power supply line, the pull of the electromagnet 36 is directly effected by variations in line voltage. And since the third winding is magnetically coupled with the auxiliary field winding, as well as with the rotor and since the rotor speed is dependent somewhat upon line voltage, the pull of the electromagnet 44 is dependent upon factors including line voltage and rotor speed. The coaction of the electromagnets together with the dependence of the pull of the electromagnets upon line voltage, affords a means for compensating, within reasonable limits, for fluctuations or variations in the line voltage.

While the form of embodiment of the present invention as herein disclosed, constitutes a preferred form, it is to be understood that other forms might be adopted, all coming within the scope of the claims which follow.

What is claimed is as follows:

1. A system of motor control for a motor having a rotor and a stator, comprising, in combination, a plurality of stator windings including a plurality of field windings and a third winding connected to one of the field windings and magnetically associated with the rotor; a starting circuit including a reactance in series with one of the field windings; a running circuit with said reactance effectively removed from the circuit; and means for controlling the starting and running circuits including an electromagnet controlled by the current through one of the windings, and a second electromagnet controlled by the potential induced in the third winding by the rotor flux.

2. A system of motor control for a motor having a rotor and a stator, comprising, in combination, main and auxiliary field windings, and a third winding connected to the auxiliary field winding and magnetically associated with the rotor; a starting circuit including a reactance in series with the main field winding; a running circuit with the reactance effectively removed from the circuit; and means for controlling the starting and running circuits including an electromagnet controlled by the current through the main field winding, and a second electromagnet controlled by the potential induced in the third winding by the rotor flux.

3. A system of motor control for a motor having a rotor and a stator, comprising, in combination, main and auxiliary field windings, and a third winding connected and magnetically coupled to the auxiliary field winding, said third winding being magnetically coupled with the rotor; a starting circuit including a reactance in the circuit of the main field winding; a running circuit with said reactance effectively removed from the circuit; and means for controlling the starting and running circuits including an electromagnet controlled by the current through the main field winding, and a second electromagnet controlled by the potential across the third winding.

4. A system of motor control for a motor having a rotor and a stator, comprising in combination, a plurality of stator windings including main and auxiliary field windings, and a third winding connected to the auxiliary winding and having greater magnetic coupling with the auxiliary winding than with the main field winding, said third winding also being magnetically associated with the rotor; a starting circuit including a reactance connected in the circuit of the main field winding; a running circuit having said reactance effectively removed from the circuit; and a switch for controlling the starting and running circuits and including an electromagnet controlled by the current through the main field winding, and a second electromagnet controlled by the potential across the third winding.

5. A system of motor control for a motor having a rotor and a stator, comprising in combination, a plurality of stator windings including main and auxiliary field windings, and a third winding connected to the auxiliary field winding and effectively magnetically coupled with the rotor and only the auxiliary field winding; a starting circuit including a reactance in the circuit of the main field winding; a running circuit having said reactance effectively removed from the circuit; and a switch for controlling the starting and running circuits and including an electromagnet controlled by the current through the main field winding, and a second electromagnet controlled by the potential across the third winding.

6. A system of motor control for a motor having a rotor and a stator, comprising in combination, a plurality of stator windings including main and auxiliary field windings and a third winding; a starting circuit including a reactance in the circuit of the main field winding; a running circuit; and means for controlling the starting and running circuits including a pair of electromagnets coacting upon a common movable armature, one of said electromagnets being controlled by the current through one of the field windings to effect movement of the armature to establish the starting circuit, and the other of said electromagnets being controlled by the potential across the third winding and effecting movement of the armature to effectively remove said reactance from the circuit and thereby establish said running circuit.

7. A system of motor control for a motor having a rotor and a stator, comprising in combination, a plurality of stator windings including main and auxiliary field windings, and a third winding magnetically coupled to the rotor and having greater magnetic coupling with the auxiliary field winding than with the main field winding; a starting circuit including a reactance in the circuit of the main field winding; a running circuit; and means for controlling the starting and running circuits including a pair of electromagnets coacting upon a common movable armature, one of said electromagnets being controlled by the current through the main field winding to effect movement of the armature to establish the starting circuit, and the other of said electromagnets being controlled by the potential across the third winding and effecting movement of the armature to effectively remove said reactance from the circuit and thereby establish said running circuit.

8. A system of motor control for a motor having a rotor and a stator, comprising in combination, a plurality of stator windings including main and auxiliary field windings, and a third winding effectively magnetically coupled with the rotor and with only the auxiliary field winding; a starting circuit including a reactance in the circuit of the main field winding; a running circuit; and means for controlling the starting and running circuits including a pair of electromagnets coacting upon a common movable armature, one of said electromagnets being controlled by the current through the main field winding to effect movement of the armature to establish the starting circuit, and the other of said electromagnets being controlled by the potential across the third winding and effecting movement of the armature to effectively remove said reactance from the circuit and thereby establish the running circuit.

9. A system of motor control for a motor having a rotor and a stator, comprising in combination, a plurality of stator windings including main and auxiliary field windings, and a third winding connected to the auxiliary field winding and magnetically associated with the rotor, said third winding also having greater magnetic coupling with the auxiliary field winding than with the main field winding; a starting circuit including a reactance in the circuit of the main field winding; a running circuit; and means for controlling the starting and running circuits including a pair of electromagnets coacting upon a common movable armature, one of said electromagnets being controlled by the current through the main field winding to effect movement of the armature to establish the starting circuit, and the other of said electromagnets being controlled by the potential across the third winding and effecting movement of the armature to effectively remove said reactance from the circuit and thereby establish the running circuit.

10. A system of motor control for a motor having a rotor and a stator, comprising in combination, a plurality of stator windings including a plurality of field windings and a third winding; a starting circuit including a reactance in the circuit of one of the field windings; a running circuit; a switch having start and run positions and cooperating contacts for controlling the starting and running circuits; a pair of electromagnets for actuating the switch, one of said electromagnets being controlled by the current through one of the field windings for actuating the switch to the start position, and the other of said electromagnets controlled by the potential across the third winding for actuating the switch to the run position and thereby short-circuiting said reactance through the contacts.

11. A system of motor control for a motor having a rotor and a stator, comprising in combination, a plurality of stator windings including main and auxiliary field windings and a third winding connected to the auxiliary winding; a starting circuit including a reactance in the circuit of the main field winding; a running circuit; a switch having start and run positions and cooperating contacts for controlling the starting and running circuits; a pair of electromagnets for actuating the switch, one of said electromagnets being controlled by the current in the circuit of the main field winding for actuating the switch to the start position, and the other of said electromagnets controlled by the potential across the third winding for acuating the switch to the run position and thereby short-circuiting said reactance through the contacts.

12. A system of motor control for a motor having a rotor and a stator, comprising in combination, a plurality of stator windings including main and auxiliary field windings, and a third winding magnetically associated with the rotor and having greater magnetic coupling with the auxiliary winding than with the main field winding; a starting circuit including a reactance in the circuit of the main field winding; a running circuit; a switch having start and run positions and cooperating contacts for controlling the starting and running circuits; a pair of electromagnets for actuating the switch, one of said electromagnets being controlled by the current in the circuit of the main field winding for actuating the switch to the start position, and the other of said electromagnets controlled by the potential across the third winding for actuating the switch to the run position and thereby short-circuiting said reactance through the contacts.

13. A system of motor control for a motor having a rotor and a stator, comprising in combination, a plurality of stator windings including main and auxiliary field windings, and a third winding effectively magnetically coupled with the rotor and only the auxiliary field winding; a starting circuit including an inductive reactance in the circuit of the main field winding; a running circuit having said reactance effectively removed from the circuit and the auxiliary winding circuit opened; a switch having start and run positions, and a pair of electromagnets for controlling the starting and running circuits, one of said electromagnets being controlled by the current through the main field winding for actuating the switch to the start position, and the other of said electromagnets being controlled by the potential across the third winding for actuating the switch to the run position.

14. A system of motor control for a motor having a rotor and a stator, comprising in combination, a plurality of stator windings including main and auxiliary field windings and a third winding; a starting circuit including an inductive reactance in the circuit of one of the field windings; a running circuit having said reactance effectively removed from the circuit and the auxiliary winding circuit opened; a switch having start and run positions and a pair of electromagnets for controlling the starting and running circuits, one of said electromagnets being controlled by the current through the circuit of the main field winding for actuating the switch to the start position, and the other of said electromagnets being controlled by the potential across the third winding for actuating the switch to the run position.

15. A line voltage compensating system of motor control for a motor having a rotor and a stator, comprising, in combination, a plurality of field windings and a third winding; a starting circuit including a reactance in series with one of the field windings; a running circuit with said reactance effectively removed from the circuit; and means for controlling the starting and running circuits, said means including an electromagnet controlled by the current through one of the windings, which current is affected by line voltage, and a second electromagnet controlled by the potential across the third winding, which potential is responsive to factors including line voltage and rotor speed.

16. A system of motor control for a motor having a rotor and a stator having slots therein comprising, in combination, main and auxiliary field windings in said slots, each of said windings having sections defining magnetic poles; a third winding substantially concentric with one of said sections and magnetically associated with the rotor; a starting circuit including a reactance in the circuit of one of the field windings; a running circuit having said reactance effectively removed from the circuit; a switch having start and run positions and a pair of electromagnets for controlling the starting and running circuits, one of said electromagnets being controlled by the current through the circuit of the main field winding, and the other of said electromagnets being controlled by the potential across the third winding.

CALVIN J. WERNER.